United States Patent
Choo et al.

(10) Patent No.: US 9,981,744 B2
(45) Date of Patent: May 29, 2018

(54) DRONE

(71) Applicant: LG ELECTRONICS INC., Seoul (KR)

(72) Inventors: Zhimin Choo, Seoul (KR); Chulbae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 300 days.

(21) Appl. No.: 14/805,803

(22) Filed: Jul. 22, 2015

(65) Prior Publication Data

US 2016/0122012 A1 May 5, 2016

(30) Foreign Application Priority Data

Nov. 4, 2014 (KR) .......................... 10-2014-0152281

(51) Int. Cl.
*B64C 39/02* (2006.01)
*B64C 29/00* (2006.01)
(Continued)

(52) U.S. Cl.
CPC ........... *B64C 39/028* (2013.01); *A63H 27/12* (2013.01); *B64C 27/50* (2013.01);
(Continued)

(58) Field of Classification Search
CPC ..... B64C 27/50; B64C 29/0025; B64C 39/02; B64C 39/024; B64C 39/028;
(Continued)

(56) References Cited

U.S. PATENT DOCUMENTS 7,712,701 B1 * 5/2010 Ehrmantraut ........... B64C 27/20
244/17.23
2006/0011777 A1 * 1/2006 Arlton ..................... B64C 27/10
244/7 B
(Continued)

FOREIGN PATENT DOCUMENTS

JP 2002-316699 A 10/2002
KR 10-2006-0052643 A 5/2006

OTHER PUBLICATIONS

International Search Report and Written Opinion dated Oct. 13, 2015 issued in Application No. PCT/KR2015/007508 (English translation).

*Primary Examiner* — Nicholas McFall
(74) *Attorney, Agent, or Firm* — KED & Associates, LLP (57) ABSTRACT

There is disclosed a drone including a main body comprising a motor, a shaft inserted in the main body vertically, a wing unit rotatable on the shaft by a power generated from the motor, the wing unit comprising a propeller unfolded horizontally and folded vertically, wherein the motor comprises a first motor and a second motor, and the shaft comprises an upper shaft inserted in the main body from a top vertically and a lower shaft inserted in the main body from a bottom vertically, and the wing unit comprises a first wing unit rotated on the upper shaft in a first direction by a power generated from the first motor, and a second wing unit rotated on the lower shaft in a second direction, which is the reverse of the first direction, by a power generated from the second motor.

19 Claims, 12 Drawing Sheets (51) Int. Cl.
*B64C 27/50* (2006.01)
*A63H 27/00* (2006.01)

(52) U.S. Cl.
CPC .......... *B64C 29/0025* (2013.01); *B64C 39/02* (2013.01); *B64C 2201/027* (2013.01); *B64C 2201/108* (2013.01); *B64C 2201/127* (2013.01)

(58) Field of Classification Search
CPC .......... B64C 2201/024; B64C 2201/88; B64C 2201/102; B64C 2201/108; B64C 2201/127; B64C 2201/162; A63H 27/14; A63H 27/12
See application file for complete search history.

(56) References Cited

U.S. PATENT DOCUMENTS

| | | |
|---|---|---|
| 2009/0097973 A1 | 4/2009 | Cabrera et al. |
| 2010/0012769 A1 | 1/2010 | Alber et al. |
| 2012/0025012 A1 | 2/2012 | Arlton et al. |

* cited by examiner

DRONE

CROSS-REFERENCE TO RELATED APPLICATION(S)

This application claims priority under 35 U.S.C. § 119 to Korean Application No. 10-2014-0152281 filed in Korea on Nov. 4, 2014, whose entire disclosure is hereby incorporated by reference.

BACKGROUND

1. Field

Embodiments of the present disclosure relate to a drone using a coaxial counter-rotating rotor, more particularly, a drone which may have a foldable propeller for easy keeping and which may also minimize damage to the propeller and other components.

2. Background

Helicopters are aircrafts which fly by an aerodynamic lift generated from a rotor rotated by an engine. Such helicopters may be classified into conventional helicopters having a size allowing a pilot or a pilot and one or more passengers and unmanned helicopters, i.e., drones having a relatively small size. With recent development of wireless communication and mobile terminals, techniques using functions of a drone and a mobile terminal combinedly are being developed.

For instance, examples of such functions include data and voice communication, image and video capturing which uses a camera, and voice recording and etc. Some terminals may implement an additional function of electronic games (i.e., video games) or a function for a multimedia player.

As having diversified functions, such a drone may be realized as a multimedia player having combined functions including image or video capturing and broadcasting signal receiving.

Especially, in case a camera is installed in the drone, more functions may be implemented. The drone having the camera may be used in lifesaving as well as reconnaissance.

As a driving manner for flying a drone there are a coaxial counter-rotating manner for a conventional drone has two coaxial rotors and a multiple-axial rotating manner for a drone having multiple rotors rotating on different axes to generate an aerodynamic lift. However, such a conventional drone has a propeller which cannot be folded and a volume of the conventional drone cannot be reduced. The not-foldable propeller need protecting from external circumstances and it requires an auxiliary members. The requirement of the auxiliary members results in increase of an overall drone weight and a higher power is required to keep and maintain the aerodynamic lift.

SUMMARY

Accordingly, an object of the present disclosure is to address the above-noted and other problems.

Another object of the present disclosure is to provide a foldable propeller to a drone by reducing a volume increased by a necessary propeller when a drone is not used, which the problem is mentioned above.

To achieve these objects and other advantages and in accordance with the purpose of the embodiments, as embodied and broadly described herein, Embodiments of the present disclosure may provide a drone including a main body comprising a motor; a shaft inserted in the main body vertically; and a wing unit rotatable on the shaft by a power generated from the motor, the wing unit comprising a propeller unfolded horizontally and folded vertically, wherein the motor comprises a first motor and a second motor, and the shaft comprises an upper shaft inserted in the main body from a top vertically and a lower shaft inserted in the main body from a bottom vertically, and the wing unit comprises a first wing unit rotated on the upper shaft in a first direction by a power generated from the first motor, and a second wing unit rotated on the lower shaft in a second direction, which is the reverse of the first direction, by a power generated from the second motor.

The wing unit comprises a first rotating member formed in a ring shape surrounding the shaft, the first rotating member comprising a gear receiving a rotation force from the motor; a first link having one end connected to the first rotating member by a first join, the first link comprising the propeller; a second link having one end connected to the other end of the first link by a second joint; and a second rotating member having one end connected to the other end of the second link, having a ring shape surrounding the shaft, and when the second rotating member is spaced apart from the first rotating member, an angle formed by the first and second links is increased and the propeller is unfolded, and when the second rotating member is approaching the first rotating member, the angle formed by the first and second links is decreased and the propeller surrounds an outer portion of the main body.

An effect of the drone in accordance with the present disclosure is to provide a foldable propeller to a drone by reducing a volume increased by a necessary propeller when a drone is not used. Accordingly, the drone may have enhanced portability and mobility.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The embodiments will be described in detail with reference to the following drawings in which like reference numerals refer to like elements and wherein.

The present invention will become more fully understood from the detailed description given herein below and the accompanying drawings, which are given by illustration only, and thus are not limitative of the present invention, and wherein.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
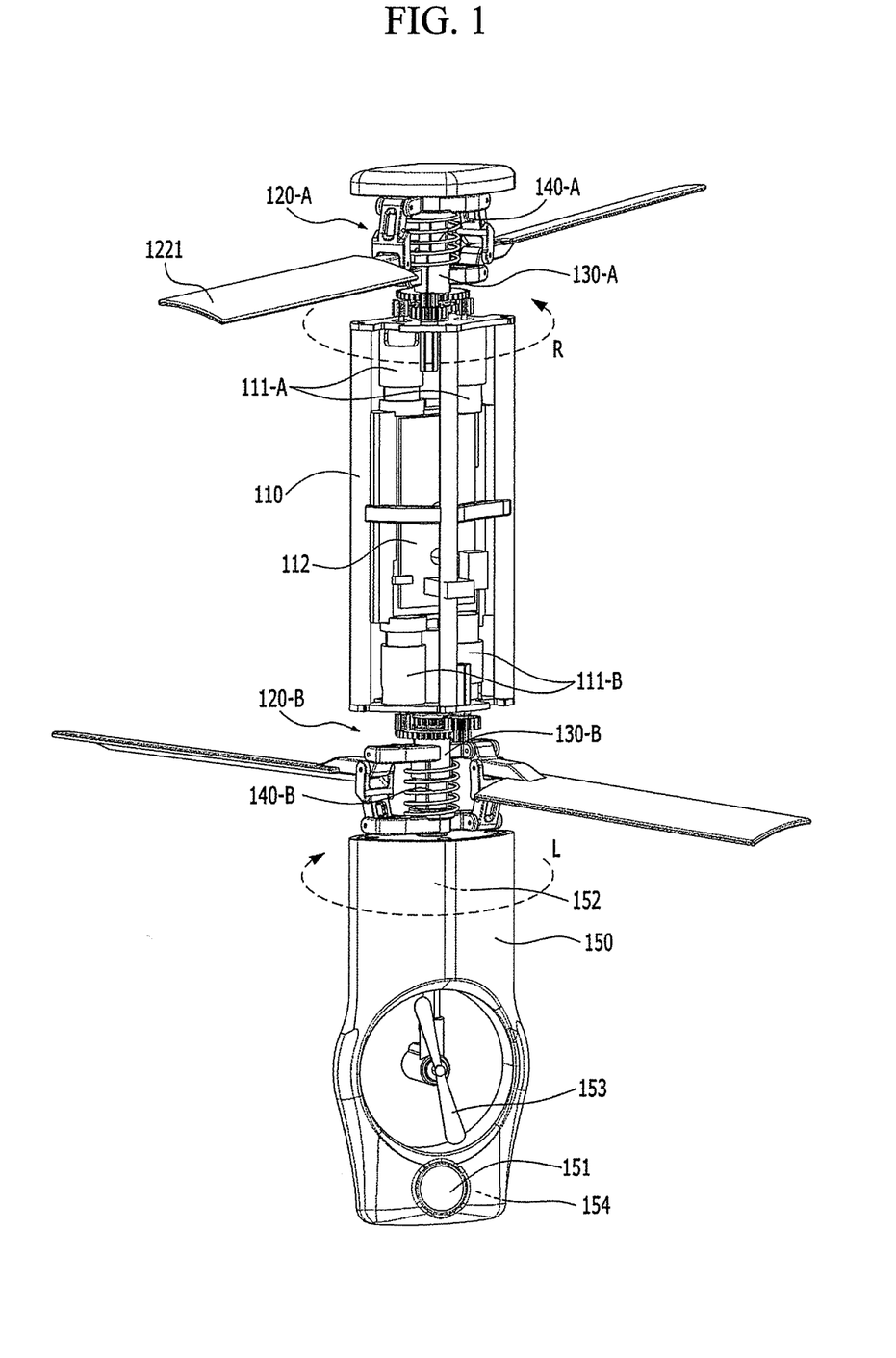
FIG. 1 is a diagram illustrating one embodiment of a drone in accordance with the present disclosure.

FIG. 1 is a diagram illustrating one embodiment of a drone in accordance with the present disclosure.

The drone 100 may include a main body 110 having a PCB unit 112 in which components are loaded and a motor 111, a wing unit 120, a shaft 130 and a sub-body 150.

The overall weight of the drone 100 has to be reduced as much as possible so that a sufficient aerodynamic lift can be generated with by a small electric power. The main body 110 has a profile enough to fix the internal components therein.

The wing unit 120, the shaft 130 and the motor 111 are provided in symmetry with respect to a center of the main body 110, such that they may be divided into an upper part and a lower part. Accordingly, the components may be divided into the upper part and the lower part on the assumption of the symmetrical structure, unless otherwise noted. The upper part shall mark with '-A' at the end of the numeral reference and the lower part shall mark with '-B' at the end of the numeral reference. When it is okay to describe both of the upper and lower parts, '-A' or '-B' can be omitted.

The shaft 130 may be vertically inserted in the main body 110. The wing unit 120 may be rotated on the shaft 130 by a force generated in the motor 111 and it includes a propeller 1221 unfolded horizontally and folded vertically.

The motor 111 may consist of a first motor 111-A providing a first rotational force in a first direction (i.e., R direction) with respect to a vertical axis and a second motor 111-B providing a rotational force in a second direction (i.e., L direction) which is the reverse of the first direction (R direction). Each of the first motor 111-A and the second motor 111-B may consist of two or more to generate a sufficient driving force. The first motor 111-A and the second motor 111-B may be provided in the main body 110 along an opposite direction. To minimize usage of gears and other components, the first motor 111-A may be arranged in the uppermost portion and the second motor 111-B may be arranged in the lowermost portion of the main body 110, and vice versa. Shafts of the first motor 111-A and the second motor 111-B may be rotatable in the reverse direction, so that the propellers 1221 connected to the motors, respectively, may be rotated in the reverse direction to provide the aerodynamic lift used in lifting the drone 100.

A recess may be formed in an upper portion of the main body 110 to partially insert an upper shaft 130-A therein in a vertical direction and a recess may be formed in a lower portion of the main body to partially insert a lower shaft 130-B therein in a vertical direction.

A first wing unit 120-A may be rotated in a first direction (R direction) with respect to the upper shaft 130-A by a driving force generated in the first motor 111-A. in contrast, a second wing unit 120-B may be rotated in a second direction (L direction), which is the reverse of the first direction (R direction), with respect to the lower shaft 130-B by a force generated in the second motor 111-B.

A camera unit 151 may be installed in the sub-body 150 to process an image frame. A direction of a lens provided in the camera unit 151 may be adjustable in a preset range of angles to photograph desired places while the drone 100 is flying. The camera unit 151 may include one or more of a camera sensor (e.g., CCD, CMOS and so on), a photo sensor (i.e., an image sensor) and a laser sensor.

A third motor 152 may be arranged in the sub-body 150 and the third motor 152 may provide a rotational force in a third direction with respect to a horizontal shaft. A horizontal rotor 153 may be rotated in a third direction or the reverse direction of the third direction by the rotational force of the third motor 152 to generate the power for moving the drone 100 in a horizontal certain direction.

The camera unit 151 and the laser sensor may be combined to sense a distance to a sensing object for 3-dimensional image. The photo sensor may be disposed in a display device and such the photo sensor may scan movement of the sensing object near a touch screen. Specifically, the photo sensor may scan an object put on the photo sensor, using an electrical signal changeable according to the amount of the light applied to a photo diode mounted in columns and lines together with a transistor (TR). In other words, the photo sensor performs calculation of coordinates of the sensing object based on variation of the amount of the light, only to acquire location information about the sensing object.

The camera unit 151 may process a still image or an image frame of a video gained by the image sensor in a camera mode or a video call mode. The processed image frame may be stored in a memory or transmitted to another terminal via a GPS module or a transmitting/receiving module or to a terminal controlling movement of the drone 100.

The sub-body 150 may be fixed to the main body 110 in direction of the lower shaft 130-B.

The lower shaft 130-B may include a hollow formed in a vertical direction. A camera circuit 154 may be provided, having one end connected to the camera unit 151 and the other end connected to the PCB unit 112, passing the hollow.

Figure 2:
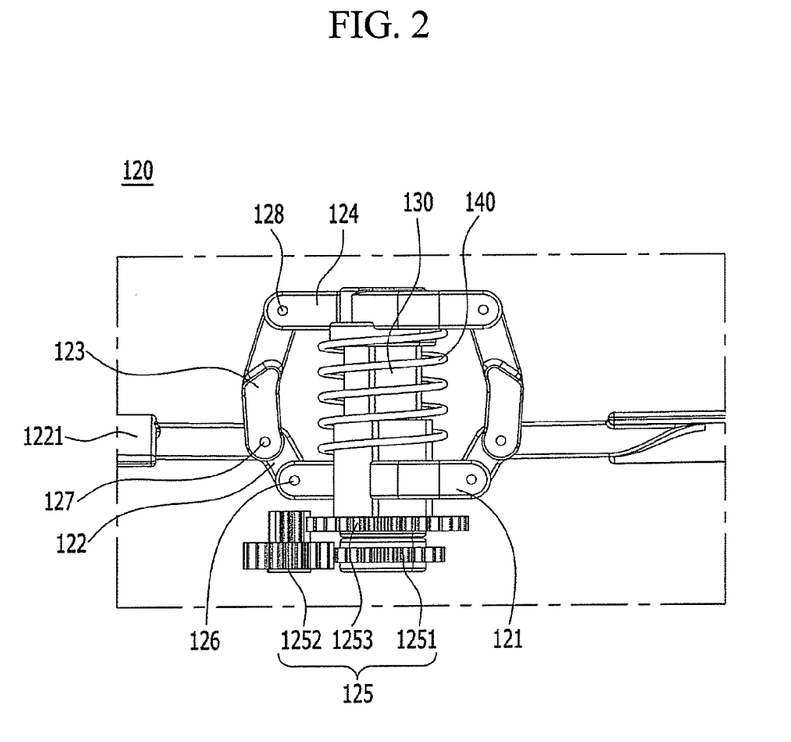
FIG. 2 is a diagram illustrating one embodiment of a wing unit and a spring provided in the drone in accordance with the present disclosure.

FIG. 2 is a diagram illustrating one embodiment of the wing unit 120 and a spring 140 provided in the drone in accordance with the present disclosure.

The wing unit 120 may consist of two rotating members 121 and 124, two links 122 and 123 and three joints, to realize a foldable mechanism.

A gear unit 125 connected to a first rotating member 121 may be provided with a rotational force by the motor (111, see FIG. 1). An initial gear 1251 engaging with a middle gear 1252 directly from the shaft of the motor (111, see FIG. 1) may transmit the rotational force. At this time, the middle gear 1252 may control the propeller 1221 to have a rotation number proper to the driving. The middle gear 1252 may transmit the rotational force to the last gear 1253 receiving the rotational force finally. A rotation center of the last gear 1253 may be the shaft 130. The first rotating member 121 may have a ring shape for surrounding the shaft 130. The last gear 1253 provided with the rotational force may rotate the first rotating member 121.

One end of a first link 122 may be connected with one end of the first rotating member 121 by a first joint 126. The first link 122 may include the propeller 1221. Two or more propellers 1221 may be provided in one wing unit 120 for stable balance.

One end of the second link 123 may be connected with the other end of the first link 122 by a second joint 127.

A second rotating member 124 may be connected with the other end of the second link 123 by a third joint 128. The second rotating member 124 may have a ring shape for surrounding the shaft 130.

When the second rotating member 124 is distant from the first upper rotating member 121, an angle formed by the first and second links 122 and 123 is increasing and the propeller 1221 is unfolded. When the second rotating member 124 is approaching the first rotating member 121, the angle formed by the first and second links 122 and 123 is decreasing and the propeller 1221 is folded to surround the main body 110.

The spacing between the second rotating member 124 and the first rotating member 121 which is necessary to fold the propeller 1221 may be enabled by a spring 140 pressed between the first and second rotating members 121 and 124 to apply a tension.

Figure 3:
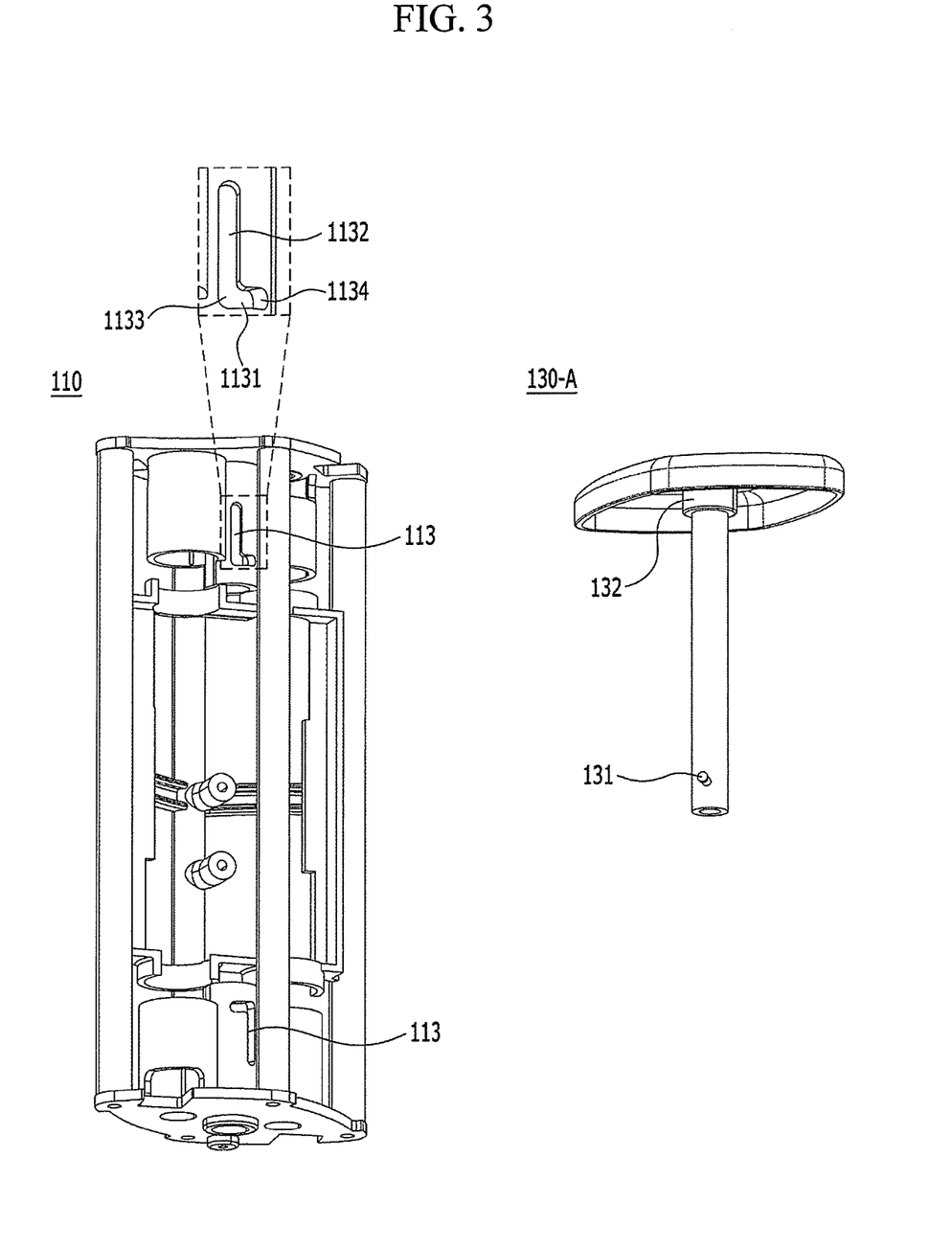
FIG. 3 is a diagram illustrating one embodiment showing a status before coupling a main body and a shaft to each other in the drone in accordance with the present disclosure.
Figure 4:
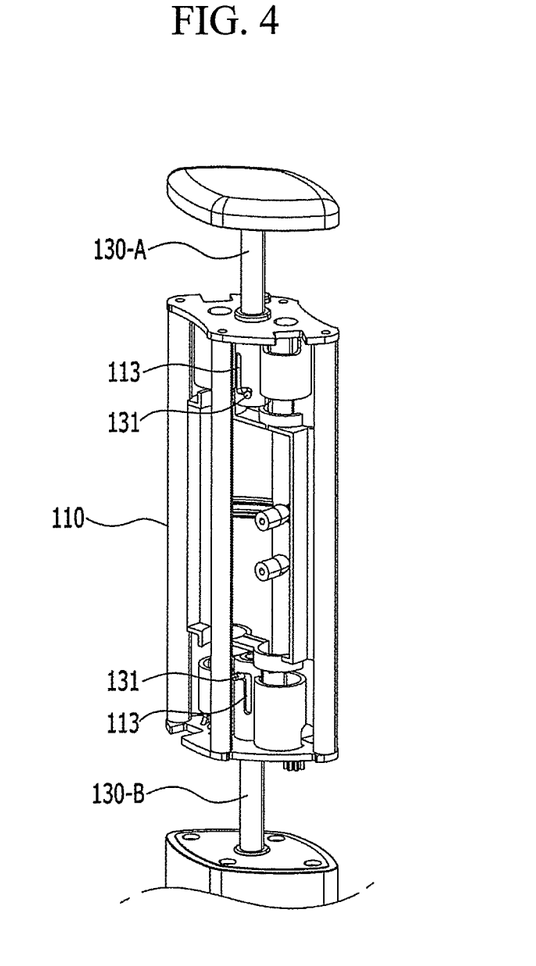
FIG. 4 is a diagram illustrating one embodiment after coupling the main body and the shaft to each other in the drone in accordance with the present disclosure.

FIG. 3 is a diagram illustrating one embodiment showing a status before coupling the main body 110 and the shaft 130 to each other in the drone in accordance with the present disclosure. FIG. 4 is a diagram illustrating one embodiment after coupling the main body 110 and the shaft 130 to each other in the drone in accordance with the present disclosure.

A cap 132 may be coupled to one end of the shaft 130 and an external diameter of the cap 132 is larger than an internal diameter of the second rotating member (124, see FIG. 2) to prevent the wing unit (120, see FIG. 2) from leaving the shaft 130. The second rotating member (124, see FIG. 2) cannot be spaced apart from the first rotating member (121, see FIG. 1) by the compressed cap 132 in spite of the tension of the compressed spring (140, see FIG. 2). Accordingly, the shaft 130 and the cap 132 coupled to the shaft 130 inserted in the main body 110 have to be out of the main body 110 together, so that the second rotating member 124 may be spaced apart from the first rotating member 121 to unfold the propeller 1221. In other words, the spacing of the second rotating member (124, see FIG. 2) from the first rotating member (121, see FIG. 2) may be subordinate to the insertion in or putting out of the main body 110 of the shaft 130.

A hook 131 may be projected from a lateral surface of the shaft 130. The hook 131 may move along a 'ㄴ'-shaped slot and 'ㄱ'-shaped slot provided in a lateral surface of the main body 110. When the hook 131 is located in a horizontal portion 1131 of the 'ㄴ'-shaped slot or the 'ㄱ'-shaped slot 113, the spring (140, see FIG. 2) is pressed and applies the tension to the second rotating member 124 and the shaft 130. When the hook 131 is hooked to the horizontal portion 1131 of the 'ㄴ'-shaped slot or the 'ㄱ'-shaped slot 113 and the shaft 130 is restricted from being put out.

The shaft 130 is rotated to locate the hook 131 at an crossing point 1133 of the horizontal portion 1131 and the vertical portion 1132 of the slot which is one end of the horizontal portion 1131 of the 'ㄴ'-shaped slot 113, so that the hook 131 and the shaft 130 may be located in the vertical portion 1132 of the 'ㄴ'-shaped slot or the 'ㄱ'-shaped slot 113. In this instance, the restriction is released so that the shaft 130 may be put out of the main body 110 by the tension of the spring 140. At this time, the upper shaft 130-A may be moved upwardly as far as a distance of the vertical portion 1132 of the 'ㄴ'-shaped slot 113 by the hook 131. The lower shaft 130-B may be moved downwardly as far as a distance of the vertical portion 1132 of the 'ㄱ'-shaped slot 113 by the hook 131.

Figure 5:
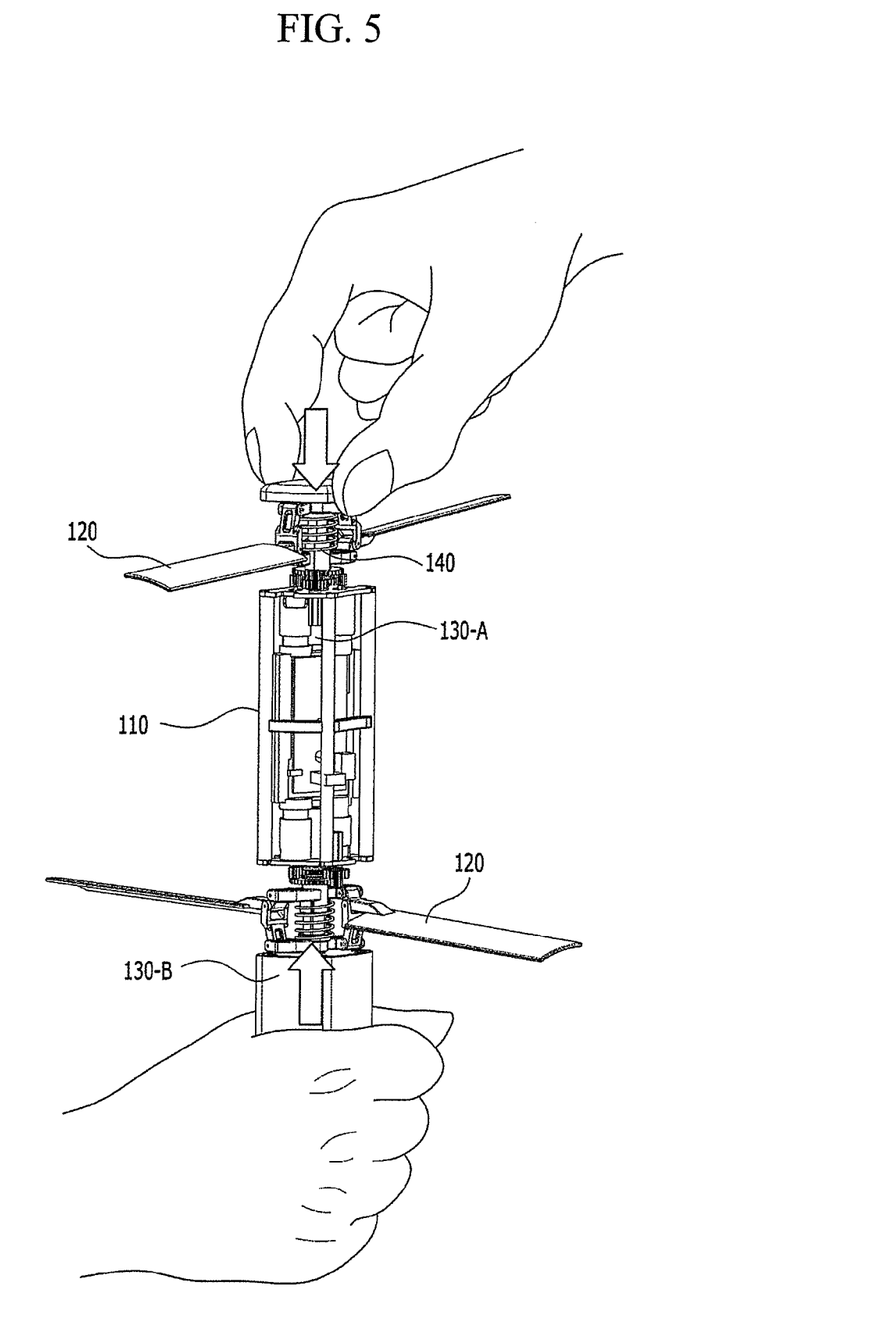
FIGS. 5 and 6 are diagrams illustrating one embodiment for securely folding the wing unit of the drone.
Figure 6:
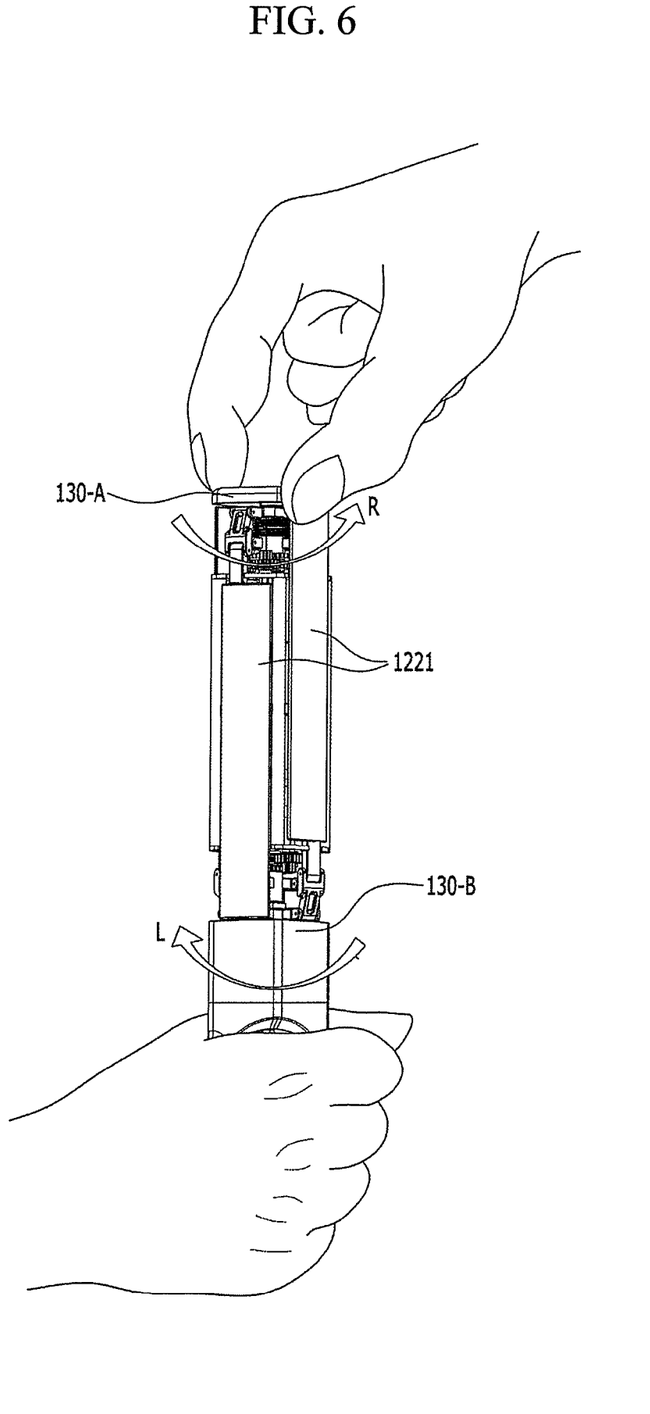

FIGS. 5 and 6 are diagrams illustrating an embodiment for securely folding the wing unit 120 of the drone 100.

FIG. 5 is illustrating an embodiment for folding the wing unit 120 of the drone 100.

When a sufficient force for pressing the spring 140 is applied to both ends of the drone 100, the upwardly moved shaft 130 is re-inserted in the main body 110 and the cap (132, see FIG. 3a) presses the second rotating member (124, see FIG. 2) to fold the propeller 1221. At this time, the hook 131 of the shaft 130 is moved to the crossing point (1133, see FIG. 3) between the horizontal portion 1131 of the slot and the vertical portion 1132 of the slot of the main body 110.

FIG. 6 is illustrating an embodiment for securing the folded wing unit.

After the hook 131 of the shaft 130 is moved to the crossing point (1133, see FIG. 3) between the horizontal portion 1131 of the slot and the vertical portion 1132 of the slot of the main body 110, the upper shaft 130-A is twistedly rotated in a counter-clockwise direction (R) and the lower shaft 130-B is rotated in a clockwise direction (L) with respect to the main body 110. In this instance, the hook 131 is moved to one end (1134, see FIG. 3) of the horizontal portion (1131, see FIG. 3) of the slot (113, see FIG. 3) to restrict the folded propeller 1221 from being unfolded by the tension of the spring (140, see FIG. 2).

FIGS. 7 to 12 are diagrams illustrating an embodiment for folding the propeller 1221 of the drone 100 in accordance with the present disclosure.

FIGS. 7 to 11 illustrating Embodiment 1 for folding the propellers 1221 of the drone 100 in accordance with the present disclosure alternately.

Embodiment 1

Figure 7:
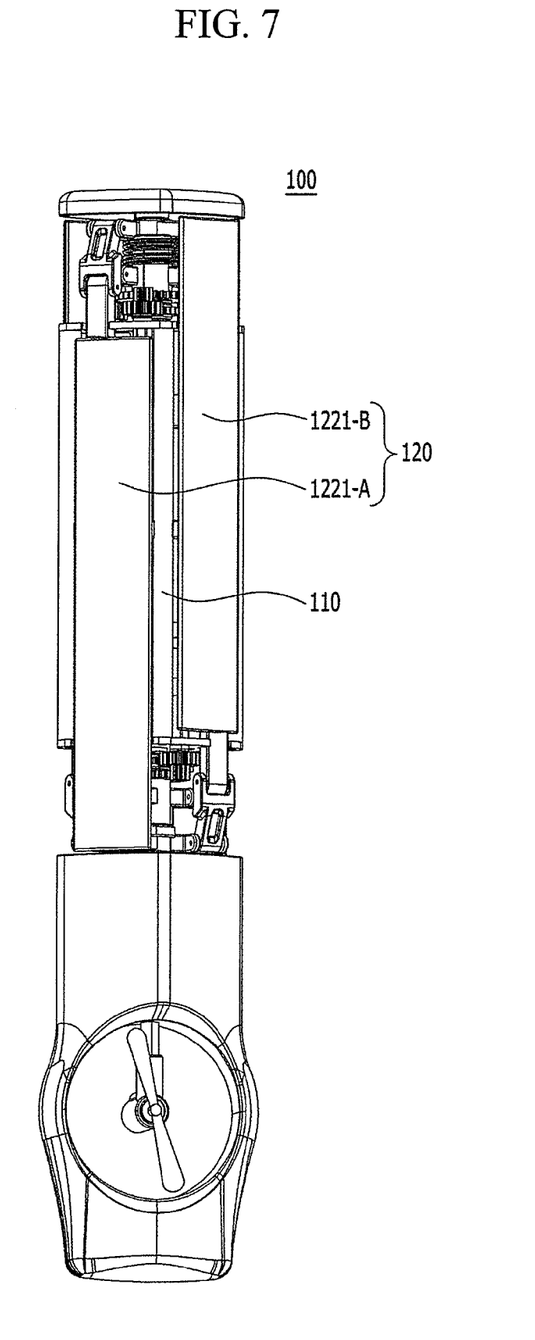
FIG. 7 is a diagram illustrating a status where a propeller of the drone in accordance with the present disclosure is alternately folded.

FIG. 7 illustrating a status where the propellers 1221 of the drone 100 in accordance with the present disclosure are alternately folded.

When the propellers 1221 of the wing unit 120 are folded, two propellers 1221-A of the first wing unit and two propellers 1221-B of the second wing unit are alternately arranged. The alternately arranged four propellers 1221 may surround the main body 110. When the four propellers 1221 are alternately arranged to surround the main body 110, the internal space of the main body 110 is hidden so that the exterior appearance of the drone may be enhanced and such alternative arrangement may bring a design or mechanical stability. In addition, the propellers 1221 are not overlapped with each other, so that the volume of the drone 100 can be minimized.

Figure 8:
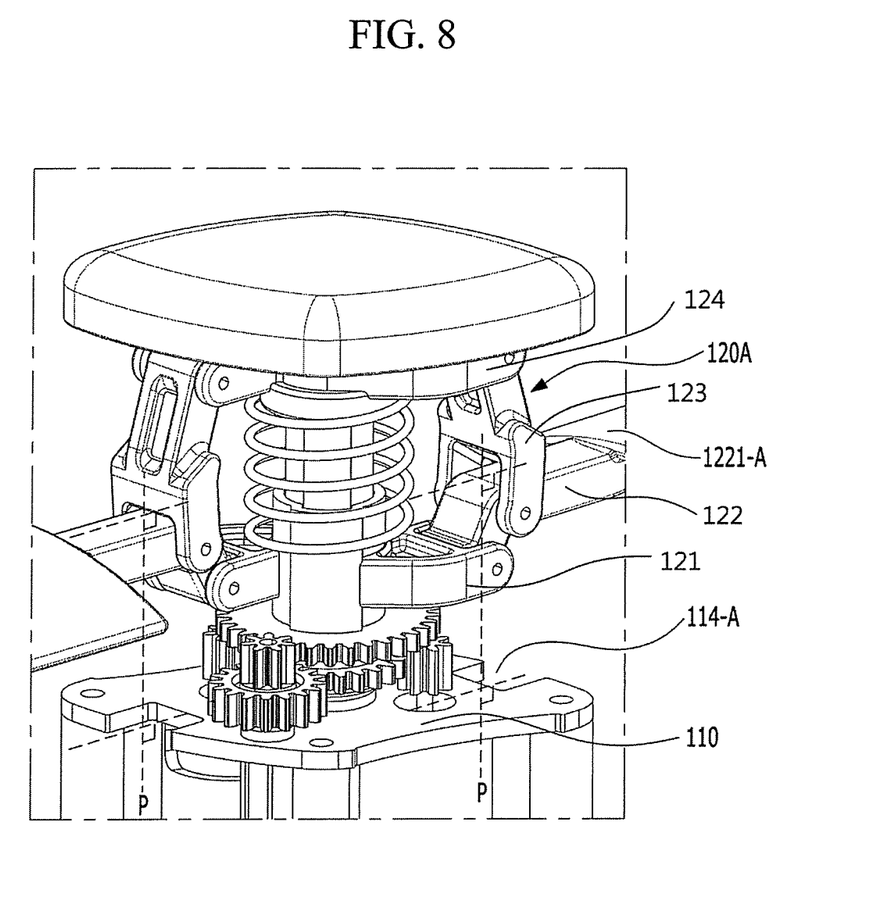
FIG. 8 is a diagram illustrating one embodiment of the wing unit and grooves formed in the main body provided in the drone in accordance with the present disclosure.

FIG. 8 illustrating an embodiment of the wing unit 120 and a groove 114 formed in the main body 110 provided in the drone 100 in accordance with the present disclosure.

In Embodiment 1, the propellers 1221 may be folded as close as possible to the main body 110. Accordingly, when the propellers 1221 of the wing unit 120 are folded, the first link 122 having the propellers 1221 may partially interfere in the main body 110. To prevent the interference between the first link 122 and the main body 110, a groove 114 may be formed in the portion of the main body 110 interfering in the folded first link 122 of the wing unit 120 to partially accommodate the first link 122.

Two upper grooves 114-A may be located at 180 degrees with respect to the vertical shaft and two lower grooves 114-B may be also located at 180 degrees with respect to the vertical shaft. Two upper grooves 114-A and two lower grooves 114-B are alternatively arranged at 90 degrees, so that the propellers 1221-A of the first wing unit and the propellers 1221-B of the second wing unit may be alternatively arranged after folded.

In Embodiment 1, the propellers 1221 have to be rotated a preset angle to be located collinearly to the groove 114 of the main body 110, before they are folded.

Hereinafter, embodiments 1-1 and 1-2 for automatically locating (P) the propellers 1221 collinearly to the groove 114 of the main body 110 by the pressing process of the shaft 130 (see FIG. 5) will be described.

Figure 9:
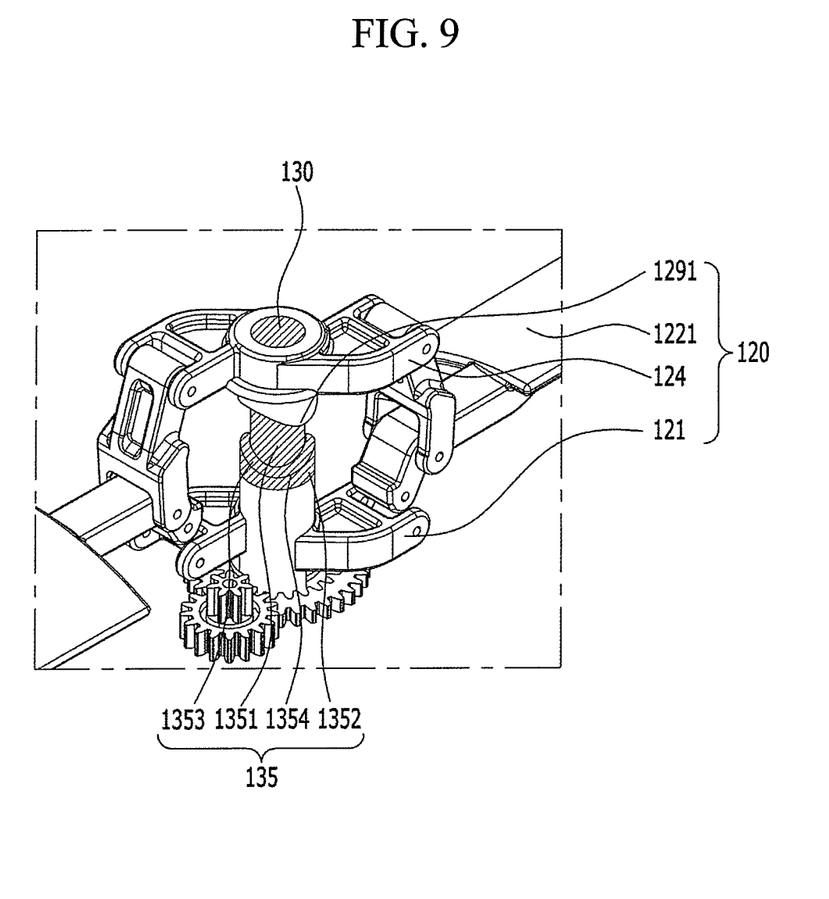
FIG. 9 is a front perspective diagram illustrating a coupling status between the wing unit and the shaft in an embodiment 1-1.

FIG. 9 is a front perspective diagram illustrating an embodiment 1-1 for coupling between the wing unit 120 and the shaft 130 (the spring is omitted to make the embodiment understood easily).

The second rotating member 124 of the wing unit 120 may include a projected portion 1291 projected toward the first rotating member 121. The shaft 130 may include a step 135 having a step bottom 1351 the second rotating member 124 is moving along and a step top 1352 restricting the movement of the second rotating member 124. The step 135 may further include a recessed portion 1354 formed in a shape corresponding to the shape of the projected portion 1291 and an inclined surface 1353 arranged to the recessed portion 1354.

The second rotating member 124 spaced apart from the first rotating member 121 by the tension of the spring is approaching the first rotating member 121 by the pressing force, the wing unit 120 may be rotated on the shaft 130 a proper angle to move the projected portion 1291 along the inclined surface 1353 to the recessed portion 1354. The recessed portion 1354 of the shaft 130 may be located at a preset angle with respect to the groove 114 of the main body 110 to locate the first link 122 having the propellers 1221 at a position (P, see FIG. 8) collinearly to the groove 114 of the main body 110.

The inclined surface 1353 may be formed in a curved shape from the projection 1291 to the recessed portion 1354, so that the projection 1291 may move smoothly to the recessed portion 1354 only by the vertical-direction power of the second rotating member 124.

The number of the recessed portions 1354-A provided in the upper shaft 130-A may be two. And the two recessed portions 1354-A may be located at 180 degrees with respect to a vertical shaft. Also, the number of the recessed portions 1354-B provided in the lower shaft 130-B may be two. And the two recessed portions 1534-B may also be located at 180 degrees with respect to the vertical shaft. The recessed portions 1534-A of the upper shaft 130-A and the recessed portions 1534-B of the lower shaft 130-B may be alternately arranged at 90 degrees with respect to the vertical shaft.

Figure 10:
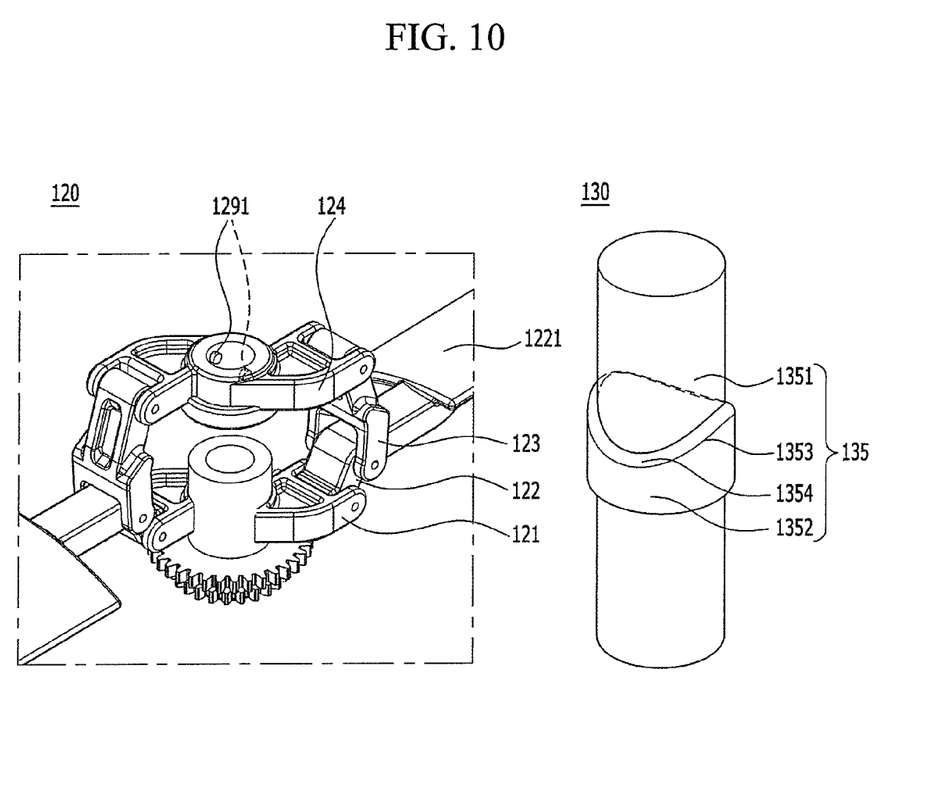
FIG. 10 is a front perspective diagram illustrating each of the wing unit and the shaft in an embodiment 1-2.
Figure 11:
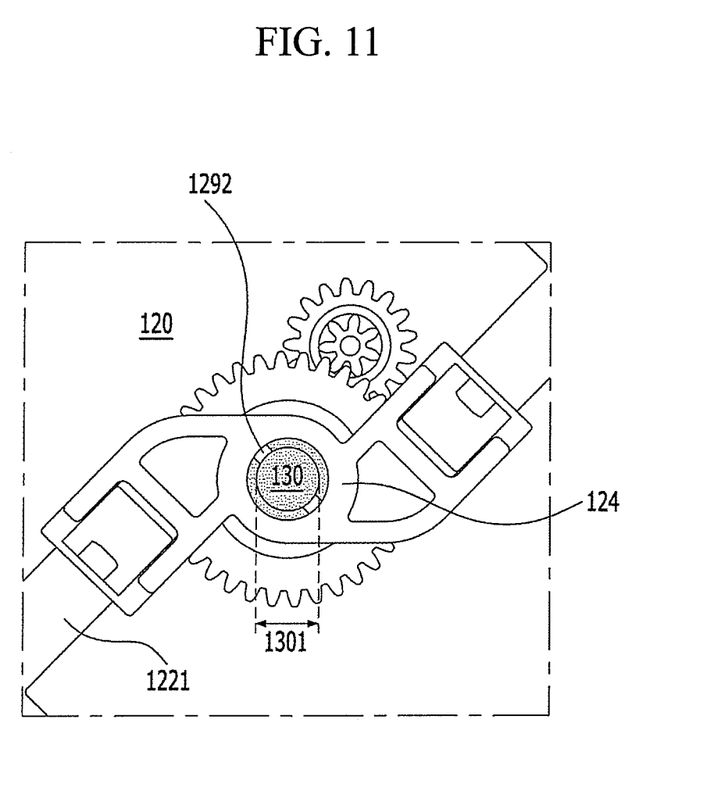
FIG. 11 is a plane view illustrating a coupling between the wing unit and the shaft in the embodiment 1-2.

FIG. 10 is a front perspective diagram illustrating each of the wing unit 120 and the shaft 130 in an embodiment 1-2. FIG. 11 is a plane view illustrating a coupling between the wing unit 120 and the shaft 130 in the embodiment 1-2.

Unlike the embodiment 1-1, the projection 1291 provided in the second rotating member may be projected toward a central axis. The minimum diameter of the second rotating member 124 after putting the projection 1291 into consideration may be the diameter 1301 or more of the shaft 130 (see FIG. 11).

The shaft 130 may include a step 135 having a step bottom 1351 where the second rotating member 124 are moving and a step top 1352 restricting the movement of the second rotating member 124. The step 135 may include a recessed portion 1354 having a shape corresponding to the shape of the projection 1291 and an inclined surface 1353 inclinedly formed to the recessed portion 1354.

The second rotating member 124 spaced apart from the first rotating member 121 by the tension of the spring is approaching the first rotating member 121 by the pressing force, the wing unit 120 may be rotated on the shaft 130 a proper angle to move the projected portion 1291 along the inclined surface 1353 to the recessed portion 1354. The recessed portion 1354 of the shaft 130 may be located at a preset angle with respect to the groove 114 of the main body 110 to locate the first link 122 having the propellers 1221 at a position (P, see FIG. 8) collinearly to the groove 114 of the main body 110.

The inclined surface 1353 is formed in a curved shape from the projection 1291 to the recessed portion 1354, so that the projection 1291 may move smoothly to the recessed portion 1354 only by the vertical-direction power of the second rotating member 124.

The number of the recessed portions 1354-A provided in the upper shaft 130-A may be two. And the two recessed portions 1354-A may be located at 180 degrees with respect to a vertical shaft. Also, the number of the recessed portions 1354-B provided in the lower shaft 130-B may be two. And the two recessed portions 1534-B may also be located at 180 degrees with respect to the vertical shaft. The recessed portions 1534-A of the upper shaft 130-A and the recessed portions 1534-B of the lower shaft 130-B may be alternately arranged at 90 degrees with respect to the vertical shaft.

Figure 12:
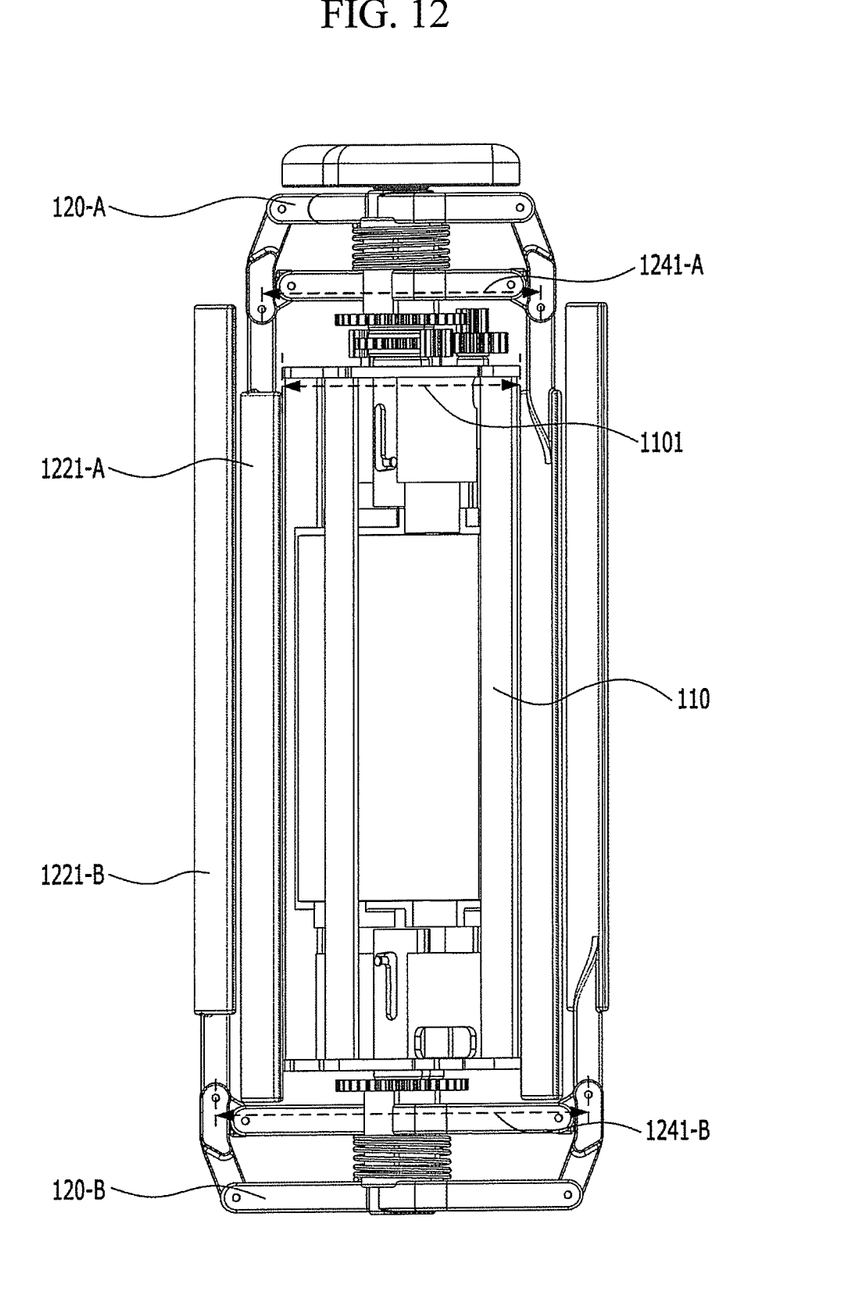
FIG. 12 is a diagram illustrating an embodiment 2 disclosing a folded wing unit provided in the drone in accordance with the present disclosure.

FIG. 12 is a diagram illustrating an embodiment 2 disclosing a folded wing unit 120 provided in the drone 100 in accordance with the present disclosure.

Embodiment 2

As another embodiment for preventing the interference in the upper propellers 1221-A in the lower propellers 1221-B, when the propellers 1221 is folded the distance to the propellers 1221-A of the first wing unit may be different from the distance to the propellers 1221-B of the second wing unit from the central axis of the shaft 130 to prevent the interference. The distances may be larger than the maximum diameter 1101 of the main body 110 with respect to the central axis of the shaft 130.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A drone comprising:
a main body that includes a motor system, wherein the motor system includes a first motor and a second motor;
a shaft system including a first shaft inserting into a top of the main body and a second shaft inserting into a bottom of the main body;
a wing unit system rotatable on the shaft system based on power from the motor system, the wing unit system including at least one propeller provided in a horizontal direction at an unfolded position and provided in a vertical direction at a folded position;
a third motor to provide a rotational force in a third direction with respect to a third shaft;
a horizontal rotor to rotate based on the rotational force provided by the third motor; and
a sub-body to attach to the second shaft,
wherein the wing unit system includes a first wing unit to rotate on the first shaft in a first direction based on power from the first motor, and a second wing unit to rotate on the second shaft in a second direction, reverse of the first direction, based on power from the second motor.

2. The drone of claim 1, wherein the wing unit system includes:
a first rotating member, in a ring shape, to surround the shaft system, the first rotating member including a gear to receive a rotation force from the motor system;
a first link having a first end connected to the first rotating member by a first joint, and the propeller coupled to the first link;
a second link having a first end connected to a second end of the first link by a second joint; and
a second rotating member having one end connected to a second end of the second link, the second rotating member having a ring shape to surround the shaft system, and
when the second rotating member is spaced apart from the first rotating member in a first position, an angle between the first link and the second link is increased and the propeller is in the unfolded position, and
when the second rotating member is approaching the first rotating member in a second position, the angle between the first link and the second link is decreased and the propeller surrounds a portion of the main body.

3. The drone of claim 2, wherein a first distance from a center axis of the shaft system to a propeller of the first wing unit is different from a second distance from a center axis of the shaft system to a propeller of the second wing unit, and
each of the first distance and the second distance is larger than a maximum diameter of the main body with respect to the center axis of the shaft system.

4. The drone of claim 2, further comprising:
a spring between the first rotating member and the second rotating member to apply a tension and space the second rotating member from the first rotating member.

5. The drone of claim 4, further comprising:
a cap to couple to one end of the shaft system, the cap having an external diameter that is larger than an internal diameter of the second rotating member,
wherein when the cap is pressed to insert the shaft system in the main body, the spring is pressed to fold the propeller.

6. The drone of claim 5, further comprising:
a 'L'-shaped slot and a '7'-shaped slot at a lateral surface of the main body;
a first hook to project from a lateral surface of the first shaft to move along the 'L'-shaped slot; and
a second hook to project from a lateral surface of the second shaft to move along the '7'-shaped slot,
wherein the shaft system is moved outwardly from the main body by tension of the spring, when the first hook and the second hook are in a portion extended in a vertical direction with respect to the 'L'-shaped slot and the '7'-shaped slot.

7. The drone of claim 2, wherein when the propeller is at the folded position, a propeller of the first wing unit and a propeller of the second wing unit are alternately arranged.

8. The drone of claim 7, wherein the main body further includes a groove to partially accommodate the first link, when the propeller of the first wing unit is in the folded position.

9. The drone of claim 8, wherein the wing unit system further includes a projection to project from the second rotation member to the first rotating member or a center axis of the first rotating member, and
the shaft system further includes a step that includes a recessed portion having a shape corresponding to a shape of the projection, and that is an inclined surface that is inclined to the recessed portion, and
when the second rotating member is approaching the first rotating member, the wing unit system is rotated on the shaft system to move the projection along the inclined surface of the step.

10. The drone of claim 8, wherein two or more recessed portions are provided in the shaft system and the two recessed portions are located 180 degrees apart with respect to a vertical shaft, and two recessed portions of the first shaft and two recessed portions of the second shaft are alternatively arranged 90 degrees apart with respect to the vertical shaft.

11. The drone of claim 1, wherein the sub-body includes a camera to capture a video image, and the second shaft includes a hollow; and
a camera circuit unit having a first end connected to the camera and a second end connected to a circuit board through the hollow.

12. A drone comprising:
a body;
a first motor and a second motor;
a first shaft and a second shaft in the body;
a first wing device rotatable on the first shaft in a first direction based on power from the first motor, the first wing device including a first propeller to unfold and fold;
a second wing device rotatable on the second shaft in a second direction based on power from the second motor;
a first rotating member in a ring shape about the first shaft, the first rotating member including a gear to receive a force from the first motor;
a first link having a first end coupled to the first rotating member by a first joint, the first propeller coupled to the first link;
a second link having a first end coupled to a second end of the first link by a second joint; and
a second rotating member having a first end connected to a second end of the second link, the second rotating member having a ring shape about the first shaft, and
when the second rotating member is spaced apart from the first rotating member in a first position, an angle between the first link and the second link is increased and the first propeller is in an unfolded state, and
when the second rotating member is closer to the first rotating member in a second position, the angle between the first link and the second link is decreased and the first propeller is about an outer portion of the body.

13. The drone of claim 12, further comprising:
a spring between the first rotating member and the second rotating member to control a space between the second rotating member and the first rotating member.

14. The drone of claim 13, further comprising:
a cap to couple to a first end of the first shaft, the cap having an external diameter that is larger than an internal diameter of the second rotating member,
wherein based on the movement of the cap to move the first shaft in the body, the spring is pressed to fold the first propeller.

15. The drone of claim 14, further comprising:
a 'L'-shaped slot and a '7'-shaped slot at a surface of the body;
a first hook at a surface of the first shaft to move along the 'L'-shaped slot; and
a second hook at a surface of the second shaft to move along the '7'-shaped slot,
wherein the shaft system is moved outwardly from the body by tension of the spring, when the first hook and the second hook are in a portion extended in a vertical direction with respect to the 'L'-shaped slot and the '7'-shaped slot.

16. The drone of claim 12, wherein the second wing device includes a second propeller to unfold and fold.

17. The drone of claim 15, wherein in a folded position, the first propeller of the first wing device and the second propeller of the second wing device are alternately arranged about the body.

18. The drone of claim 12, further comprising:
a third motor to provide a rotational force in a third direction with respect to a third shaft;
a horizontal rotor to rotate based on the rotational force provided by the third motor, and
a sub-body attached to the second shaft.

19. A drone comprising:
a body;
a first motor and a second motor;
a first shaft and a second shaft in the body, and the first shaft and the second shaft form a shaft system;
a first wing device rotatable on the first shaft in a first direction based on power from the first motor, the first wing device including a first propeller to unfold and fold;
a second wing device rotatable on the second shaft in a second direction based on power from the second motor,
a first rotating member in a ring shape about the first shaft, the first rotating member including a gear to receive a force from the first motor;
a first link having a first end coupled to the first rotating member by a first joint, the first propeller coupled to the first link;
a second link having a first end coupled to a second end of the first link by a second joint; and
a second rotating member having a first end connected to a second end of the second link, the second rotating member having a ring shape about the first shaft, and
when the second rotating member is spaced apart from the first rotating member in a first position, an angle between the first link and the second link is increased and the first propeller is in an unfolded state, and
when the second rotating member is closer to the first rotating member in a second position, the angle between the first link and the second link is decreased and the first propeller is about an outer portion of the body;
a spring between the first rotating member and the second rotating member to control a space between the second rotating member and the first rotating member,
a cap to couple to a first end of the first shaft, the cap having an external diameter that is larger than an internal diameter of the second rotating member, wherein based on the movement of the cap to move the first shaft in the body, the spring is pressed to fold the first propeller,
a 'L'-shaped slot and a '7'-shaped slot at a surface of the body;
a first hook at a surface of the first shaft to move along the 'L'-shaped slot; and
a second hook at a surface of the second shaft to move along the '7'-shaped slot,
wherein the shaft system is moved outwardly from the body by tension of the spring, when the first hook and the second hook are in a portion extended in a vertical direction with respect to the 'L'-shaped slot and the '7'-shaped slot
wherein in a folded position, the first propeller of the first wing device and a second propeller of the second wing device are alternately arranged about the body.

* * * * *